I. MASSE.
PACKAGE OF CAMEMBERT CHEESE.
APPLICATION FILED SEPT. 16, 1912.
1,054,433.  Patented Feb. 25, 1913.
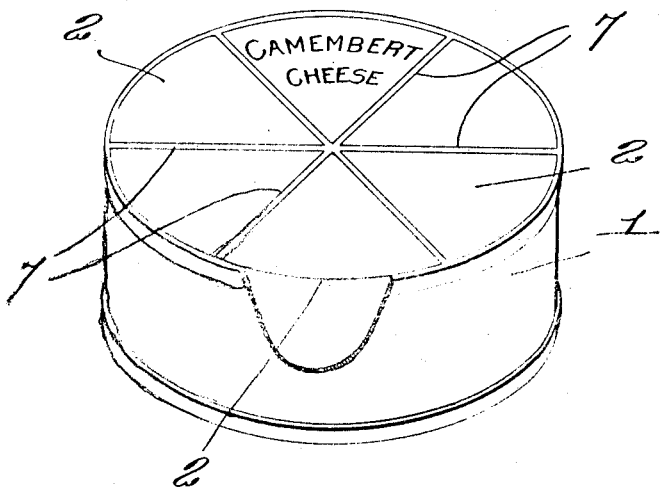
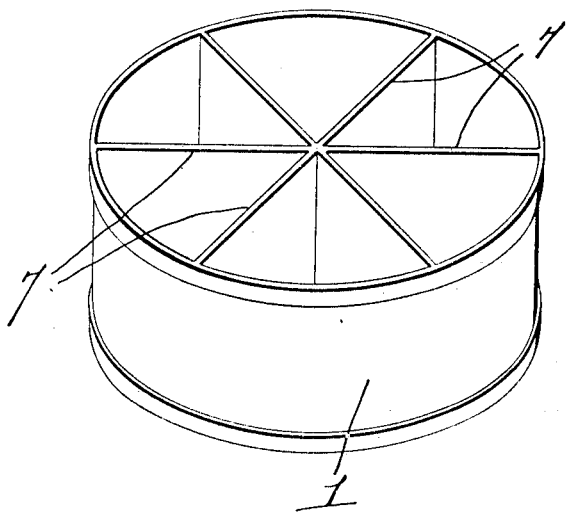
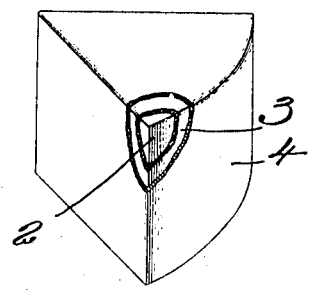

UNITED STATES PATENT OFFICE.

ISIDOR MASSÉ, OF NEW YORK, N. Y.

PACKAGE OF CAMEMBERT CHEESE.

1,054,433. Specification of Letters Patent. Patented Feb. 25, 1913.

Application filed September 16, 1912. Serial No. 720,505.

*To all whom it may concern:*

Be it known that I, ISIDOR MASSÉ, a citizen of the United States, residing at New York, county of New York, State of New York, have invented an Improvement in Packages of Camembert Cheese, of which the following description, in connection with the accompanying drawing, is a specification, like characters on the drawing representing like parts.

This invention has for its object to provide a novel package of Camembert cheese.

It is now the common practice to pack Camembert cheese in tin cans which are hermetically sealed. Oftentimes the cheese becomes quite soft before the can is opened, and when such is the case the cheese which is taken from the tin can may have softened to such an extent as to bear no resemblance to Camembert cheese, either in taste or shape.

It is one of the objects of my invention to provide a novel way of packing Camembert cheese in tin cans so that the cheese will preserve its shape and flavor under all conditions. I accomplish this end by dividing the box or tin can into a plurality of separate compartments and then shaping the cheese into portions adapted to fit the compartments and wrapping each portion separately in tin foil or other similar wrapping. When the Camembert cheese is packed in this way the separate portions are maintained entirely separated from each other and their individual shape is preserved, so that when the can is opened each portion can be separately removed without disturbing or affecting the other portions.

Referring now to the drawings wherein I have shown one embodiment of my invention, Figure 1 is a perspective view of a can embodying my invention with the cap removed showing it filled with Camembert cheese; Fig. 2 is a perspective view of the can empty and before it is filled or sealed; Fig. 3 is a view of one of the portions of Camembert cheese which fills one of the compartments of the can.

1 designates a tin can in which the Camembert cheese is to be packed. The cheese which is packed in the can is made up into a plurality of separate portions, such, for instance, as shown in Fig. 3, and each of which is separately wrapped and labeled. Preferably, each portion of cheese is wrapped in a parchment wrapping 3 and a tinfoil wrapping 4. These separate portions are conveniently wedge shaped so that when they are placed together they fill the interior of the can 1.

In order to maintain the separation between the pieces I prefer to provide the can 1 with a plurality of partitions 7 which are herein shown as radially arranged. These partitions may be either tin or any suitable material, and may be firmly secured to the bottom and sides of the box, or may be loose in the box as desired. In any event they are so placed in the box that the space between any two adjacent partitions is of the proper shape and size to receive one of the portions 2. The various portions 2 are thus entirely separated from each other. The can is hermetically sealed in the usual way by applying a cap or top thereto in any usual way. When Camembert cheese is packed in this way each portion is maintained separate from the other portion and there is no possible chance that the various portions will stick together or lose their shape, even if the cheese tends to soften before it is used. Moreover, when a box is opened one of the portions can be removed and served without disturbing the other portions, and since these other portions are independently wrapped and labeled, they will not become soft for a considerable length of time after the can is opened.

In the serving of Camembert cheese it is a great desideratum that the separate portions of cheese should have as perfect a shape as possible. This end can be secured by my invention, while where the cheese is not thus packed it is almost impossible to serve a shapely portion if the cheese is at all soft. Another advantage secured by this invention is that any portion can be removed from the can without touching any other portion, and, therefore, the handling of the cheese can be done in an entirely sanitary manner.

Having fully described my invention, what I claim as new and desire to secure by Letters Patent is:—

A package of Camembert cheese comprising a plurality of separate portions of cheese, each separately wrapped and tightly packed in a hermetically-sealed can, and partitions interposed between the separate portions and serving to separate them from each other and to prevent them from losing their shape so long as the cheese remains in the can.

In testimony whereof, I have signed my name to this specification, in the presence of two subscribing witnesses.

ISIDOR MASSÉ.

Witnesses:
  Louis C. Smith,
  Frederick S. Greenleaf.